Patented Mar. 20, 1923.

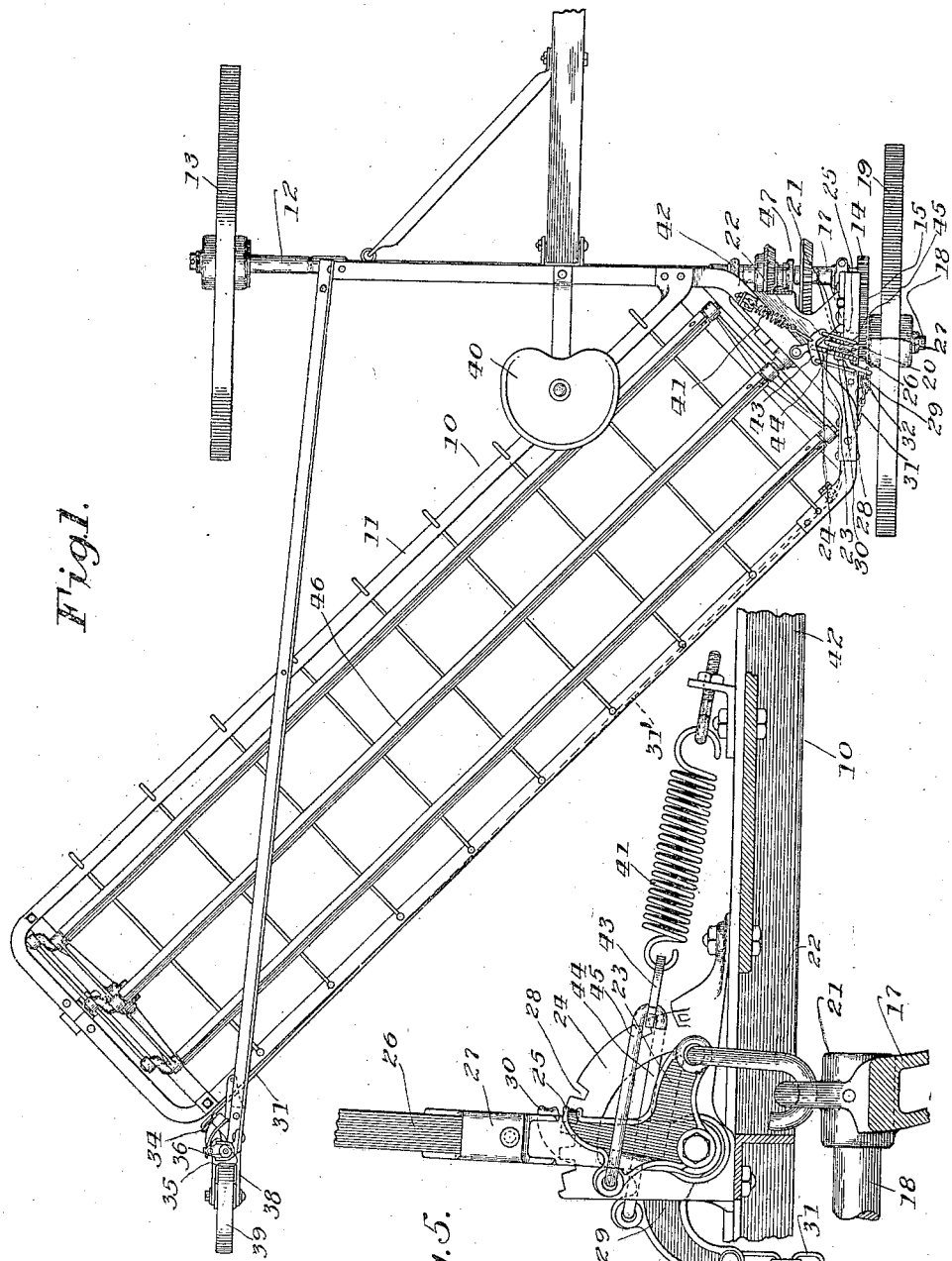

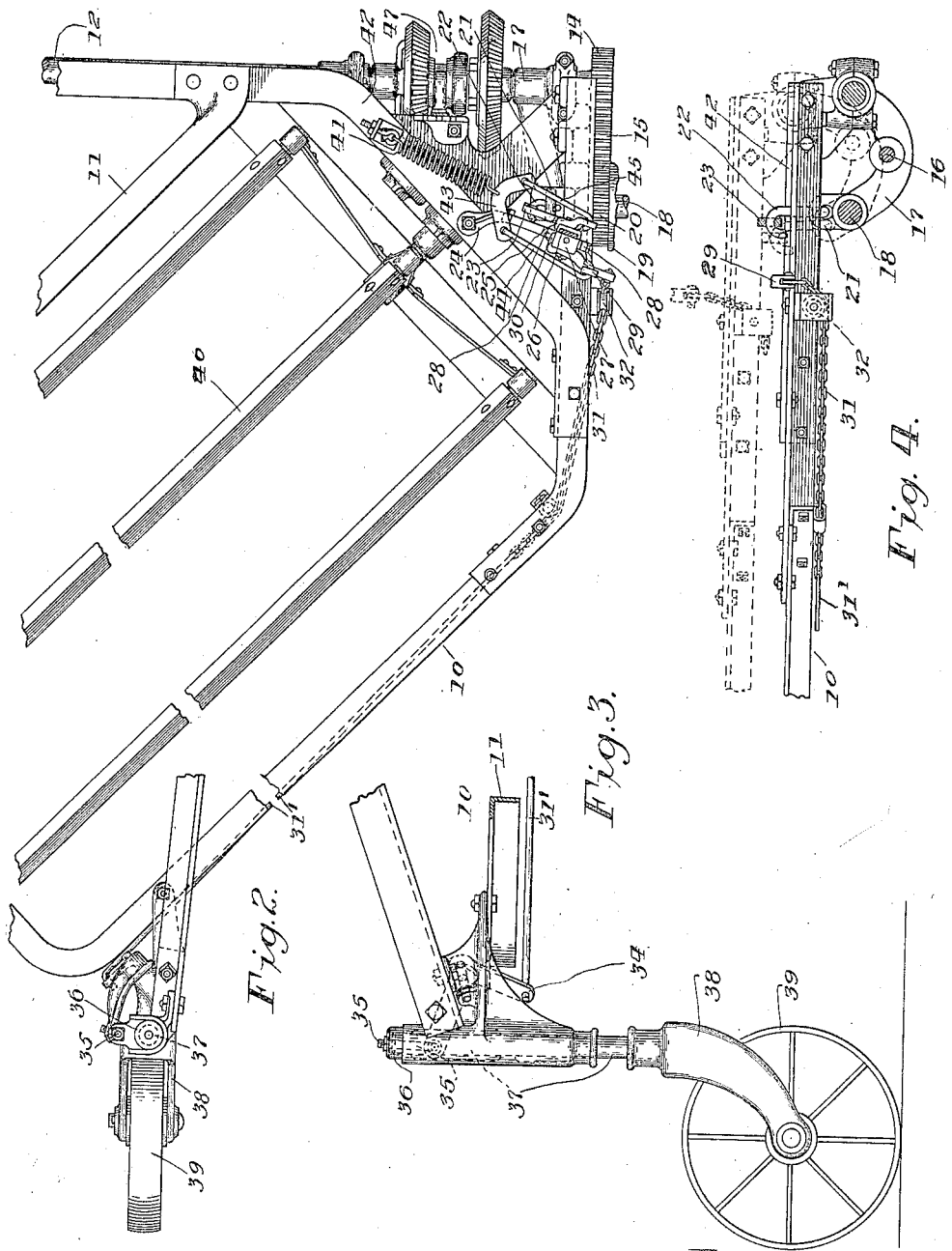

1,448,799

UNITED STATES PATENT OFFICE.

ALBERT GRIEVES, OF SPRINGFIELD, OHIO, ASSIGNOR, BY MESNE ASSIGNMENTS, TO INTERNATIONAL HARVESTER COMPANY, A CORPORATION OF NEW JERSEY.

HAYRAKE.

Application filed August 31, 1917. Serial No. 189,104.

*To all whom it may concern:*

Be it known that I, ALBERT GRIEVES, a citizen of the United States, residing at Springfield, in the county of Clark and State of Ohio, have invented certain new and useful Improvements in Hayrakes, of which the following is a full, clear, and exact specification.

This invention relates to hay rakes.

One of the objects of the invention is to facilitate the raising and lowering of both ends of the raking member.

Another object is to permit either end of the raking member to rise and fall independently when obstructions are met and to give the rake frame a floating action.

Another object is to equalize the raising and lowering movements given to different parts of the raking member.

These and other objects are accomplished by providing, in a rake, a wheel structure, a raking member, and means whereby the raking member may be supported for free rising and falling movement at either end with respect to the wheel structure to be raised or lowered independently of the other end.

The invention is illustrated on the accompanying sheets of drawings, in which—

Figure 1 is a plan view of a combined side delivery hay rake and tedder embodying my invention;

Figure 2 is a fragmentary plan view showing the same on an enlarged scale;

Figure 3 is a fragmentary detail view showing the connections whereby the rear end of the rake frame may be raised and lowered;

Figure 4 is a detail view showing the front end of the rake frame in a raised and lowered position; and, Figure 5 is a detail view showing the yieldable equalizing connection associated with the control means for raising and lowering the rake frame.

The various novel features will be apparent from the following description and drawings and will be particularly pointed out in the appended claims.

I have shown my invention in connection with a combined side delivery hay rake and tedder 10. However, the same is applicable to a rake or to a tedder. The hay tool is of the side delivery type having a rearwardly and angularly extending rake frame 11 supported at its front end by a power shaft 12 having at one end a carrying wheel 13. The opposite end of the power shaft 12 is provided with a gear 14 which meshes with an intermediate gear 15 mounted upon a stud 16 carried by a bracket 17 pivotally mounted upon the power shaft 12. Mounted in the free end of the bracket 17 is a shaft 18, upon one end of which is mounted the second front carrying wheel 19 from which rotary movement may be transmitted to a gear 20 also mounted upon the shaft 18 and which meshes with the intermediate gear 15. The free end of the bracket 17 is provided with an eye portion 21, which receives one end of a link 22, the other end of which is hooked into a bell crank lever 23 pivotally mounted on a segment 24. This bell crank lever 23 has a laterally extending stop portion 25 which normally engages one edge of a control lever 26 having a detent 27 which cooperates with the notches 28 in the segment 24 to lock the control lever in adjusted position. Pivoted concentrically with the bell crank lever 23 is a bell crank lever 29 on the opposite side of the segment 24 and also having a laterally extending stop portion 30 which also engages one edge of the control lever 26. The other arm of the bell crank lever 29 has connected to it a chain 31 which passes under a sheave 32 secured to one of the rearwardly and angularly extending frame members of the rake frame 11, said chain having a link 31' intermediate its ends and extending rearwardly and angularly under said frame member. The link is connected to one end of a suitably supported lever 34, the other end of which is connected to a link 35 which is adjustably connected to a collar 36 secured on the upper end of a stem 37, to the lower end of which is secured a forked member 38, in which the rear caster wheel 39 is mounted.

By means of this arrangement it is apparent that if the control lever 26, which is arranged conveniently with respect to the operator's seat 40, is drawn toward the operator's seat, the bell crank levers 23 and 29 will be rocked in the same direction through their stop portions 25 and 30, respectively, for simultaneously raising the front and rear portions of the frame; or, in other words, raising the whole rake frame as a unit. The operator is assisted in raising the rake frame by an equalizing spring 41, one end of which is adjustably connected to the cross frame member 42, and the other end of which is hooked into a curved equalizing bar 43 intermediate the ends of the latter. A link 44 connects one end of the equalizing bar 43 with a portion of the bell crank lever 29, and another link 45 connects the other end of the equalizing bar 43 and a portion of the other bell crank member 23. This equalizing spring 41 is of a strength to equalize the weight of the operator and is connected to the front and rear wheel frames in a manner to assist in different proportions the raising of the front and rear portions of the rake frame.

It will be noted that the front end of the rake frame is raised by applying a downward pressure upon the free end of the bracket 17 and by applying a downward pressure upon the stem 37 of the caster wheel, which actions are occasioned mainly when the hand control lever 26 is swung toward the operator's seat. It will be noted, however, that when the front portion of the rotary raking member or cylinder 46 encounters an obstruction, the front portion of the rake frame with its raking member will be raised independently of the rear portion of the rake frame due to the fact that the bell crank lever 23 is independently movable with respect to the control lever 26, and, likewise, when the rear portion of the rotary raking member 46 engages an obstruction, the rear portion of the raking frame with the raking member will be raised independently of the front portion of the rake frame due to the fact that the other bell crank lever 29 is independently movable with respect to the control lever 26. Again, if the central portion of the rotary raking member should encounter an obstruction, both ends of the rake frame and the rake would be raised simultaneously, or, in other words, the whole rake frame with its rake would be raised as a unit due to the fact that both of the bell crank levers 23 and 29 are independently movable with respect to the common control lever 26. In each case, as soon as the obstruction is passed, the rake frame and raking member will lower automatically until the stops 25 and 30 of the bell crank levers 23 and 29, respectively, pass into engagement with the edge of the control lever 26. It will be seen that not only is there an equalizing action in connection with the raising and lowering of the front and rear portions of the rake frame, but also that the rake frame and its rake are mounted for rising and falling with respect to the wheels supporting the rake structure.

Any suitable gearing arrangement 47 may be used between the power shaft and the raking member to give the latter a rotary action in either direction for raking and tedding purposes.

It is apparent that there may be various modifications of the invention as herein particularly shown and described, and it is my intention to cover all such modifications which do not involve a departure from the scope of the invention as set forth in the following claims.

What I claim as new is:

1. In a rake, the combination of a raking member, supporting means therefor and means whereby both ends of the raking member are resiliently balanced with one another for free rising movement with respect to said supporting means.

2. In a rake, the combination of a raking member, supporting means therefor, means for raising both ends of said raking member and equalizing means for assisting the raising of the two ends of said raking member.

3. In a rake, the combination of supporting means, a raking member adjustable relative thereto, means for raising and lowering said raking member, and equalizing means operative in connection with the changing of elevation of said raking member relative to said supporting means.

4. In a rake, a frame, a raking member mounted for free rising movement with respect to said frame, adjusting mechanism for said raking member, means whereby the raking member and said adjusting member may be raised at either end independently of the other and also simultaneously at both ends, and means for counterbalancing one of said ends against the other end of said raking member in its raising movement.

5. In a rake, the combination of front and rear supporting wheels, a frame supported thereby, a raking member carried by said frame, and a single spring connected to said frame and operative between said frame and said front and rear wheels whereby the frame and raking member may have a yielding movement in one direction with respect to said wheels.

6. In a rake, the combination of a raking member, a plurality of supporting wheels therefor, members operatively connected with each of said wheels by means of which the raking member may be raised and lowered, and single resilient means connected to said separate members whereby the raking member is yieldable upwardly with respect to said wheels.

7. In a rake, the combination of a raking member, supporting wheels therefor, a control member, separate connections between said control member and said supporting wheels whereby different portions of the raking member may be adjusted simultaneously and supplemental means cooperating with said control member and assisting in raising said raking member.

8. In a rake, the combination of a raking member, supporting members therefor, a control member, separate connections between said control member and said supporting member, cooperating means connecting said separate connections whereby different portions of the raking member may be adjusted simultaneously and means whereby different portions of the frame may yield independently of the movement of said control member.

9. In a rake, the combination of a raking member, supporting members therefor, a control member, separate connections between said control member and said supporting members whereby the raking member may have its position changed with respect to said supporting members, and equalizing means connected with said separate connections.

10. In a rake, the combination of a raking member, supporting members therefor, a control member, separate connections between said control member and said supporting members whereby the raking member may have its position changed with respect to said supporting members, and yieldably mounted equalizing means connected with said separate connections.

11. In a rake, the combination of a raking member, front and rear supporting wheels therefor, a control lever, separate connections between said supporting wheels and said control lever whereby said raking member may be adjusted with respect to said supporting wheels, and means whereby said connections may be moved independently of movement of said control lever.

12. In a rake, the combination of a raking member, front and rear supporting wheels therefor, a control lever, separate connections between said front and rear wheels and said lever whereby the raking member may be raised and lowered with respect to said supporting wheels, and means whereby said raking member may move bodily in a given direction independently of movement of the control lever.

13. In a rake, the combination of a frame, wheels supporting said frame, a raking member carried by said frame, a control lever on said frame, separate operative connections between said wheels and said control lever whereby the frame and rake may be raised and lowered with respect to said wheels, an equalizing bar connected to said separate connections, and a resilient member connected to said equalizing bar and to said frame whereby said frame and raking member are yieldably mounted with respect to said wheels.

14. In a rake, the combination of a frame, a raking member carried thereby, a power shaft carried by said frame, front wheels operatively connected to said power shaft for transmitting motion thereto, a rear wheel for supporting the rear of said frame and and raking member, a lever carried by said frame, a bracket pivotally mounted upon said power shaft and carrying one of said wheels, an operative connection between said bracket and said lever, and an operative connection between said rear carrying wheel and said lever whereby the front and rear portions of said frame and raking member may be raised simultaneously.

15. In a rake, the combination of a frame, a raking member carried thereby, a power shaft carried by said frame, front wheels operatively connected to said power shaft for transmitting motion thereto, a rear wheel for supporting the rear of said frame and raking member, a lever carried by said frame, a bracket pivotally mounted upon said power shaft and carrying one of said wheels, an operative connection between said bracket and said lever, an operative connection between said rear carrying wheel and said lever whereby the front and rear portions of said frame and raking member may be raised simultaneously, and yieldably mounted means connected with said connections whereby the frame and raking member may yield independently of movement of said control lever.

16. In a rake, the combination of supporting members, a raking cylinder yieldably carried thereby, said supporting members being located substantially at the opposite ends of said cylinder, and a single manually operable member for exerting downward pressure upon said supporting members to raise the raking cylinder.

17. In a rake, the combination of supporting members, a rake cylinder resiliently carried thereby, means whereby either end of said rake cylinder is raised independently of the other end upon striking an obstruction and means for balancing one of said ends against the other.

18. In a rake, the combination of supporting members, a rake cylinder yieldably carried thereby, means whereby either end of said rake cylinder is raised independently of the other end upon striking an obstruction, and then lowers when the obstruction is passed, and resilient means for balancing one of said ends of said rake cylinder against the other.

19. In a rake, the combination of front and rear supporting members, a frame yieldably carried by the supporting members, a rake cylinder carried by the frame, a hand lever mounted upon said frame, and a bell crank lever on each side of the hand lever and operatively connected thereto, one of said bell crank levers being connected to one of the forward supporting members for exerting downward pressure thereon and the other bell crank lever being connected to the rearward supporting member for exerting downward pressure thereon, whereby both ends of the rake frame and cylinder are simultaneously raised upon movement of the hand lever.

In testimony whereof I affix my signature.

ALBERT GRIEVES.